(No Model.)
J. C. REUTER.
VEHICLE WHEEL.
No. 566,869.  Patented Sept. 1, 1896.
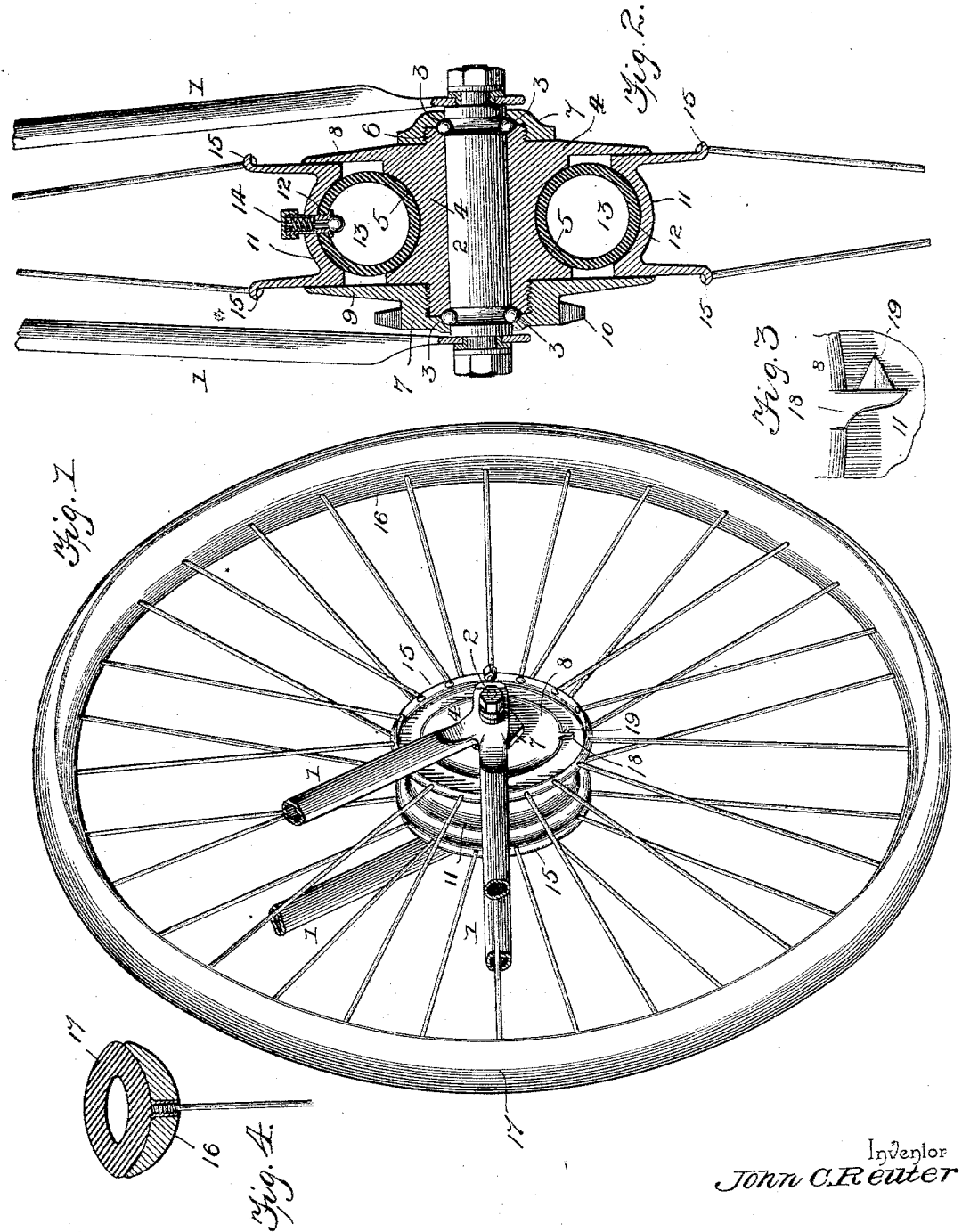
Inventor
John C. Reuter
Witnesses
E. H. Monroe
R. M. Smith
By his Attorneys,
C. A. Snow & Co.

UNITED STATES PATENT OFFICE.

JOHN C. REUTER, OF CHICAGO, ILLINOIS.

VEHICLE-WHEEL.

SPECIFICATION forming part of Letters Patent No. 566,869, dated September 1, 1896.

Application filed August 31, 1895. Serial No. 561,138. (No model.)

*To all whom it may concern:*

Be it known that I, JOHN C. REUTER, a citizen of the United States, residing at Chicago, in the county of Cook and State of Illinois, have invented a new and useful Vehicle-Wheel, of which the following is a specification.

This invention relates to an improvement in vehicle-wheels, being especially designed for use in connection with bicycles and other light vehicles in which it is desirable to absorb the vibration imparted to the wheel by the uneven nature of the road or other surface over which the wheel is passing and to prevent the transmission of such vibration to the axle and other parts of the vehicle.

The principal object of the invention is to construct a wheel in such manner that the advantages attendant upon the use of a pneumatic tire may be obtained without the disadvantages incident thereto, namely, the puncturing, gradual wearing away, and ultimate destruction of the tire.

With the above objects in view the invention consists in an improved vehicle-wheel embodying certain novel features and details of construction and specific arrangement of parts, as hereinafter fully described, illustrated in the drawings, and finally pointed out in the claim.

In the accompanying drawings, Figure 1 is a perspective view of a bicycle-wheel constructed in accordance with the present invention. Fig. 2 is an enlarged sectional view of the hub. Fig. 3 is an enlarged detail view showing the engagement between the inner portion of the hub and the surrounding spoke-section thereof. Fig. 4 is a detail cross-section through the wheel rim and tire.

Similar numerals of reference designate corresponding parts in the several figures of the drawings.

Referring to the accompanying drawings, 1 designates the forked members of a bicycle or the frame-bars of any vehicle in connection with which it is desired to use the improved wheel. The axle 2, upon which the wheel is journaled, is a fixed one, being mounted at its ends in said frame-bars in any convenient manner, and said axle is provided, adjacent to its opposite ends, with annular grooves or seats, in which are arranged series of antifriction-balls 3.

4 designates the wheel-hub proper, which is formed with a grooved or concaved periphery 5, and with laterally-projecting flanges 6, which are externally threaded to receive the bearing-cups 7. The threaded flanges 6 are grooved to form bearing-seats for the antifriction-balls 3, and the bearing-cups 7 are similarly grooved and capable of being screwed inward upon the threaded flanges 6, for the purpose of taking up wear and tightening the bearings, in a manner well understood in the art to which this invention appertains. The hub, is thus revolubly mounted upon the axle 2, and is formed at one side with a circumferential flange 8. The ball-cup 7 at the opposite side of the hub is formed with a circumferential flange 9, corresponding in size and diameter to the flange 8 of the hub and arranged exactly opposite thereto and capable of being adjusted inward with the ball-cup for a purpose that will hereinafter appear. Formed integrally with the ball-cup and its flange 9 is the sprocket-wheel 10, which is adapted to receive the drive-chain from the sprocket-wheel on the pedal-shaft, crank-axle, or other driven part of the machine.

11 designates a ring which is disposed around the hub 4 and constitutes the spoke-section of the hub. This ring or spoke section corresponds, approximately, in width to the distance between the circumferential flanges 8 and 9, above referred to, and has an internal diameter appreciably greater than the external diameter of the hub proper, 4, so that said ring or spoke section is capable of moving between said flanges and toward and away from the hub proper. The inner face of the ring 11 is groved or concaved, as indicated at 12, the arc of said groove or concavity corresponding to the groove 5 of the hub 4, and within these grooves and interposed between the hub proper and the ring or spoke section 11 is an inflatable rubber tube 13, having a valve 14, by means of which it may be inflated or deflated when desired. The hub may thus be said to be of a duplex character, comprising an inner or main portion and an outer surrounding ring or spoke section held normally in place by means of the interposed tube 13, and the circumferential flanges 8 and 9 and capable of movement circumferentially, diametrically, or tangentially with relation to the inner section of the hub. The outer or spoke section 11 is formed with oppositely-disposed annular flanges 15, which are perforated at suitable intervals to receive the inner extremities of a series of butt-ended spokes which connect with a suitable rim 16, in which a rubber cushion-tire 17 or other tire of any preferred description is arranged. In order to prevent the inner or main portion of the hub from rotating independently of the outer or spoke section thereof, one or both of the circumferential flanges 8 and 9 may be provided with radially-projecting fingers 18, arranged at diametrically opposite points, the said fingers projecting beyond the peripheries of said flanges and resting normally against laterally-projecting stops 19 on the side faces of the ring 11.

By means of the construction above described it will be seen that any jar or vibration imparted to the rim of the wheel and transmitted by the spokes to the ring or spoke section 11 of the hub will be taken up or absorbed by the inflated tube 13, so that such vibration cannot be transmitted to the inner portion of the hub and to the axle and other parts of the vehicle. The circumferential flanges keep the spoke-section in proper position and any wear between these parts may be conveniently taken up by adjusting inward that ball-cup which carries the integral flange 9 in a manner that will be readily understood. In this manner a close fit may be maintained between the two sections of the hub, and this will assist materially in preventing the wabbling of the rim, while at the same time the spoke-section is free to move toward and away from the axis of the hub, the only resistance to such movement being offered by the inflated tube 13.

Changes in the form, proportion, and minor details of construction may be resorted to without departing from the spirit or sacrificing any of the advantages of this invention.

Having thus described the invention, what is claimed as new, and desired to be secured by Letters Patent, is—

In a vehicle-wheel, a stationary axle provided adjacent to its opposite ends with annular grooves for the reception of antifriction ball-bearings, of a wheel-hub revolubly mounted thereon and having its end portions grooved to register with the grooves of the axle and also provided at one end with a circumferential flange, adjustable ball-cups having a threaded connection with the opposite ends of the hub, one of said ball-cups having the sprocket-teeth formed thereon and also having a circumferential flange formed integrally therewith and disposed opposite the similar flange on the hub, an outer ring or spoke section of the hub slidingly mounted between the said flanges and made substantially U-shaped in cross-section or provided with oppositely-disposed circumferential flanges, the central or connecting portion of said ring or spoke section being made concavo-convex, and an annular inflatable tube interposed between the main section of the hub and the spoke-section and seated within the concavities thereof, substantially as and for the purpose described.

In testimony that I claim the foregoing as my own I have hereto affixed my signature in the presence of two witnesses.

JOHN C. REUTER.

Witnesses:
JOHN H. SIGGERS,
GERTRUDE M. ATHEY.